US012626253B2

(12) United States Patent
Wang et al.

(10) Patent No.: US 12,626,253 B2
(45) Date of Patent: May 12, 2026

(54) METHOD FOR EXTRACTING AND PARSING BITCOIN TRANSACTION AUTONOMY INFORMATION

(71) Applicant: TIANJIN UNIVERSITY OF TECHNOLOGY, Tianjin (CN)

(72) Inventors: Jinsong Wang, Tianjin (CN); Zening Zhao, Tianjin (CN); Kai Shi, Tianjin (CN)

(73) Assignee: TIANJIN UNIVERSITY OF TECHNOLOGY, Tianjin (CN)

( * ) Notice: Subject to any disclaimer, the term of this patent is extended or adjusted under 35 U.S.C. 154(b) by 12 days.

(21) Appl. No.: 18/709,031

(22) PCT Filed: Jul. 21, 2023

(86) PCT No.: PCT/CN2023/108600
§ 371 (c)(1),
(2) Date: May 10, 2024

(87) PCT Pub. No.: WO2024/022242
PCT Pub. Date: Feb. 1, 2024

(65) Prior Publication Data
US 2025/0037124 A1 Jan. 30, 2025

(30) Foreign Application Priority Data

Jul. 25, 2022 (CN) .......................... 202210878845.5

(51) Int. Cl.
*G06Q 20/40* (2012.01)
(52) U.S. Cl.
CPC ....... *G06Q 20/401* (2013.01); *G06Q 2220/00* (2013.01)
(58) Field of Classification Search
None
See application file for complete search history.

(56) References Cited

U.S. PATENT DOCUMENTS 9,304,703 B1 * 4/2016 Ignomirello ............ H03M 7/55
10,984,483 B2 * 4/2021 Cuomo .............. G06Q 10/0833
(Continued)

FOREIGN PATENT DOCUMENTS

AU 2022311805 A1 * 6/2024 ......... G06Q 20/3825
CA 3072719 C * 3/2024 ......... G06F 21/6218
(Continued)

OTHER PUBLICATIONS

V. Vallois and F. A. Guenane, "Bitcoin transaction: From the creation to validation, a protocol overview," 2017 1st Cyber Security in Networking Conference (CSNet), Rio de Janeiro, Brazil, 2017. https://ieeexplore.ieee.org/document/8241988?source= IQplus (Year: 2017).*

(Continued)

*Primary Examiner* — El Mehdi Oussir
(74) *Attorney, Agent, or Firm* — JCIPRNET

(57) ABSTRACT

A method for extracting and parsing Bitcoin transaction autonomy information comprises data extraction, transaction autonomy information extraction, feature extraction, information decoding, information cleaning, information fusion, and data table construction. The method has the following beneficial effects. 1. Universality: This method is applicable to mainstream blockchain systems such as Ethereum, EOS, Polkadot, and Fabric through analysis of the current architecture of blockchain technology. 2. Effectiveness: Taking the relationship between emotional tendency of transaction autonomy information and price changes as an example, a generated dataset shows good performance in monitoring online public opinions. 3. Progressiveness: This method for extracting and parsing Bitcoin transaction autonomy information is helpful for implementing public opinion monitoring in blockchain systems, (Continued)

enhancing cybersecurity, and improving the level of information analysis.

3 Claims, 5 Drawing Sheets

(56) References Cited

U.S. PATENT DOCUMENTS

| | | | | |
|---|---|---|---|---|
| 11,991,299 | B1 * | 5/2024 | Rosenoer | H04L 9/50 |
| 12,033,136 | B2 * | 7/2024 | Dalton | G06Q 20/3827 |
| 12,511,630 | B2 * | 12/2025 | Marinkovich | G06Q 20/14 |
| 2015/0143196 | A1 * | 5/2015 | Zhang | H03M 13/2957 |
| | | | | 714/758 |
| 2016/0342977 | A1 * | 11/2016 | Lam | G06Q 20/0658 |
| 2018/0268491 | A1 * | 9/2018 | Cuomo | G06Q 40/12 |
| 2019/0065709 | A1 * | 2/2019 | Salomon | H04L 9/0643 |
| 2020/0074464 | A1 * | 3/2020 | Trevethan | G06Q 20/38215 |
| 2020/0142965 | A1 * | 5/2020 | Weldemariam | G06F 16/2379 |
| 2021/0264520 | A1 * | 8/2021 | Cummings | G06Q 40/04 |
| 2021/0374693 | A1 * | 12/2021 | La Salle | G06Q 20/0655 |
| 2023/0222493 | A1 * | 7/2023 | Jain | G06Q 20/3678 |
| | | | | 705/69 |
| 2023/0351342 | A1 * | 11/2023 | Mallik | G06Q 20/3678 |
| 2024/0113880 | A1 * | 4/2024 | Jain | G06Q 20/36 |
| 2024/0420131 | A1 * | 12/2024 | Taneja | G06Q 20/065 |
| 2025/0190966 | A1 * | 6/2025 | Gutierrez-Sheris | G06Q 20/20 |
| 2025/0378436 | A1 * | 12/2025 | Lochrane | G06Q 20/367 |

FOREIGN PATENT DOCUMENTS

| | | | | | |
|---|---|---|---|---|---|
| CN | 104639278 | A | * | 5/2015 | H04L 69/06 |
| CN | 109670950 | A | * | 4/2019 | H04L 67/1097 |
| CN | 110458554 | A | * | 11/2019 | G06Q 20/401 |
| CN | 110751554 | | | 2/2020 | |
| CN | 110751554 | A | * | 2/2020 | H04L 63/0236 |
| CN | 110782252 | A | * | 2/2020 | G06F 21/602 |
| CN | 110838064 | A | * | 2/2020 | G06Q 20/102 |
| CN | 110930149 | A | * | 3/2020 | G06Q 30/04 |
| CN | 111090875 | A | * | 5/2020 | G06F 21/602 |
| CN | 111149332 | A | * | 5/2020 | G06F 21/00 |
| CN | 111201749 | A | * | 5/2020 | H04L 9/3239 |
| CN | 111433744 | A | * | 7/2020 | G06F 9/3836 |
| CN | 112052235 | A | * | 12/2020 | G06Q 40/04 |
| CN | 112286963 | A | * | 1/2021 | G06Q 40/04 |
| CN | 112435027 | A | * | 3/2021 | G06F 21/64 |
| CN | 112818014 | A | * | 5/2021 | G06F 16/2471 |
| CN | 112860712 | A | * | 5/2021 | G06F 16/2255 |
| CN | 109347868 | B | * | 6/2021 | H04L 9/3297 |
| CN | 107679045 | B | * | 8/2021 | G06Q 30/018 |
| CN | 113282810 | A | * | 8/2021 | G06F 21/6227 |
| CN | 113364576 | A | * | 9/2021 | H04L 9/0822 |
| CN | 116012150 | | | 4/2023 | |
| CN | 111459672 | B | * | 9/2023 | G06F 16/27 |
| CN | 116795926 | A | * | 9/2023 | G06F 16/27 |
| CN | 117057806 | A | * | 11/2023 | G06Q 20/3829 |
| CN | 117094719 | A | * | 11/2023 | G06Q 20/382 |
| CN | 117195313 | A | * | 12/2023 | |
| CN | 116308841 | B | * | 2/2024 | G06Q 40/125 |
| CN | 117574320 | A | * | 2/2024 | G06F 18/25 |
| CN | 117579628 | A | * | 2/2024 | H04L 67/104 |
| CN | 117668924 | A | * | 3/2024 | H04L 47/12 |
| CN | 117896120 | A | * | 4/2024 | H04L 67/104 |
| CN | 118013560 | A | * | 5/2024 | G06F 21/577 |
| CN | 118316710 | A | * | 7/2024 | G06Q 40/04 |
| CN | 118316743 | A | * | 7/2024 | H04L 9/50 |
| CN | 114461623 | B | * | 8/2024 | G06F 21/64 |
| CN | 118631434 | A | * | 9/2024 | H04L 9/3231 |
| CN | 118780790 | A | * | 10/2024 | G06Q 40/04 |
| CN | 118897855 | A | * | 11/2024 | G06Q 40/04 |
| CN | 114757773 | B | * | 12/2024 | G06Q 20/065 |
| CN | 115396110 | B | * | 12/2024 | H04L 67/104 |
| CN | 119203152 | A | * | 12/2024 | G06F 21/6245 |
| CN | 119226250 | A | * | 12/2024 | H04L 67/1097 |
| CN | 119271745 | A | * | 1/2025 | G06Q 40/03 |
| CN | 119416208 | A | * | 2/2025 | G06Q 40/04 |
| CN | 115203647 | B | * | 4/2025 | H04L 9/3239 |
| CN | 119808159 | A | * | 4/2025 | |
| CN | 119831590 | A | * | 4/2025 | |
| CN | 119865502 | A | * | 4/2025 | H04L 9/50 |
| CN | 119941249 | A | * | 5/2025 | |
| CN | 120013557 | A | * | 5/2025 | G06Q 20/382 |
| CN | 120075250 | A | * | 5/2025 | H04L 9/40 |
| CN | 120146852 | A | * | 6/2025 | H04L 9/50 |
| CN | 120219076 | A | * | 6/2025 | G06Q 20/3821 |
| CN | 120235530 | A | * | 7/2025 | H04L 9/50 |
| CN | 120494850 | A | * | 8/2025 | |
| CN | 120512278 | A | * | 8/2025 | H04L 9/50 |
| CN | 120543176 | A | * | 8/2025 | G06F 18/2433 |
| CN | 120550417 | A | * | 8/2025 | G06Q 20/123 |
| CN | 120567462 | A | * | 8/2025 | H04L 67/1097 |
| CN | 120634776 | A | * | 9/2025 | |
| CN | 120655300 | A | * | 9/2025 | |
| CN | 120671196 | A | * | 9/2025 | |
| CN | 120744988 | A | * | 10/2025 | |
| CN | 120785520 | A | * | 10/2025 | |
| CN | 120811618 | A | * | 10/2025 | |
| CN | 120811710 | A | * | 10/2025 | |
| CN | 120812066 | A | * | 10/2025 | |
| CN | 120850266 | A | * | 10/2025 | |
| CN | 120875953 | A | * | 10/2025 | |
| CN | 120893924 | A | * | 11/2025 | |
| CN | 120951378 | A | * | 11/2025 | |
| CN | 121030772 | A | * | 11/2025 | |
| CN | 121032491 | A | * | 11/2025 | |
| CN | 121052757 | A | * | 12/2025 | |
| CN | 121056113 | A | * | 12/2025 | |
| CN | 121077653 | A | * | 12/2025 | |
| CN | 121094811 | A | * | 12/2025 | |
| EP | 3577767 | B1 | * | 10/2020 | H04N 19/50 |
| GB | 2559165 | A | * | 8/2018 | G06Q 40/00 |
| GB | 2635232 | A | * | 5/2025 | H04L 9/14 |
| JP | 7589173 | B2 | * | 11/2024 | H04L 9/50 |
| JP | 2025538950 | A | * | 12/2025 | |
| KR | 102032924 | B1 | * | 10/2019 | H04L 63/0428 |
| KR | 20200124495 | | | 11/2020 | |
| KR | 20200124495 | A | * | 11/2020 | H04L 51/214 |
| KR | 102719619 | B1 | * | 10/2024 | H04L 9/50 |
| KR | 20250136804 | A | * | 9/2025 | G06N 3/08 |
| WO | WO-2017011601 | A1 | * | 1/2017 | G09C 1/00 |
| WO | WO-2017187396 | A1 | * | 11/2017 | G06F 21/62 |
| WO | WO-2018142367 | A1 | * | 8/2018 | H03M 13/13 |
| WO | 2019034959 | | | 2/2019 | |
| WO | WO-2020061105 | A1 | * | 3/2020 | H04L 9/50 |
| WO | 2020087739 | | | 5/2020 | |
| WO | WO-2020125839 | A1 | * | 6/2020 | H04L 9/50 |
| WO | WO-2021063181 | A1 | * | 4/2021 | H03M 13/6572 |
| WO | WO-2023287969 | A1 | * | 1/2023 | G06Q 50/00 |
| WO | WO-2024022242 | A1 | * | 2/2024 | H04L 9/50 |
| WO | WO-2025123054 | A1 | * | 6/2025 | H04L 9/3247 |
| WO | WO-2025050067 | A9 | * | 12/2025 | |

OTHER PUBLICATIONS

Bartoletti et al. "An analysis of Bitcoin OP RETURN metadata," 2017 Universita degli Studi di Cagliari, Cagliari, Italy. 2017. https://arxiv.org/pdf/1702.01024 (Year: 2017).*

X. Hei, B. Bai, Y. Wang, L. Zhang, L. Zhu and W. Ji, "Feature Extraction Optimization for Bitstream Communication Protocol Format Reverse Analysis," 2019 18th IEEE Int. Conf. (TrustCom/BigDataSE), Rotorua, New Zealand, 2019, pp. 662-669, https://ieeexplore.ieee.org/document/8887410?source=IQplus (Year: 2019).*

"International Search Report (Form PCT/ISA/210) of PCT/CN2023/108600," mailed on Oct. 20, 2023, with English translation thereof, pp. 1-4.

* cited by examiner

METHOD FOR EXTRACTING AND PARSING BITCOIN TRANSACTION AUTONOMY INFORMATION

CROSS-REFERENCE TO RELATED APPLICATION

This application is a 371 of international application of PCT application serial no. PCT/CN2023/108600, filed on Jul. 21, 2023, which claims the priority benefit of China application no. 202210878845.5, filed on Jul. 25, 2022. The entirety of each of the above-mentioned patent application is hereby incorporated by reference herein and made a part of this specification.

TECHNICAL FIELD

The invention belongs to the technical field of blockchain data mining, and particularly relates to a method for extracting and parsing Bitcoin transaction autonomy information.

BACKGROUND ART

With the development of blockchain technology, public chains are frequently exploited for illicit financial activities due to their decentralized nature and challenging regulation. Conventional blockchain monitoring techniques primarily center on tracking transactions through methods like address clustering and graphical methods, placing greater emphasis on transaction behavior relationships between users, while overlooking abnormal information in individual transactions. In blockchain systems, users can add autonomous transaction information in addition to conducting transactions, which may contain any type of content, including online public opinion information. However, there is currently no effective method to extract and parse such information.

There are several traditional blockchain monitoring techniques.

(1) Address clustering-based blockchain monitoring method: Bitcoin adopts the UTXO model, allowing a single tangible user to have multiple transaction addresses in the network. As for address clustering for tangible users, identifying which addresses belong to the same entity from abnormal transaction records is a critical issue.

(2) Graph matching-based blockchain monitoring method: Two abnormal transaction behaviors, namely candy airdrop and greedy capital injection, are used as typical representatives, and rules for assessing these two behaviors are designed accordingly.

(3) Complex network-based blockchain monitoring method: Complex network analysis techniques are used to study the Bitcoin transaction network, particularly the effective use of community detection to re-identify multiple addresses belonging to the same user.

Traditional blockchain monitoring techniques focus on transaction relationships between blockchain users and do not analyze information unrelated to transactions between users. Recent blockchain messaging incidents highlight the importance of detecting and analyzing blockchain transaction data for public opinion monitoring on the blockchain, which is a significant research area in blockchain data mining.

SUMMARY OF THE INVENTION

In order to solve the above problems, the invention aims to provide a method for extracting and parsing Bitcoin transaction autonomy information.

In order to achieve the above objectives, the method for extracting and parsing Bitcoin transaction autonomy information provided by the invention comprises the following steps in sequence:

(1) building a Bitcoin client and synchronizing original block stream data to a local area; then parsing and structuring the original block stream data to obtain Bitcoin structured data; and then obtaining an output script of each transaction from the Bitcoin structured data;

(2) verifying the validity of the transaction output script by using a transaction script verification algorithm $Algorithm_{test}$; determining that the transaction is true and valid and does not contain any transaction autonomy information if the verification succeeds; and returning transaction autonomy information $Tx_{information}$ if the verification fails;

(3) extracting blockchain features from the transaction autonomy information $Tx_{information}$, and then constructing a transaction autonomy information data table by using the transaction autonomy information and the blockchain features;

(4) sequentially reading the transaction autonomy information $Tx_{information}$ from the transaction autonomy information data table, and decoding the transaction autonomy information $Tx_{information}$ by using a transaction autonomy information decoding algorithm $Algorithm_{code\_recognition}$ to obtain decoded information $Information_{decode}$; and then inserting the decoded information $Information_{decode}$ into the transaction autonomy information data table as features;

(5) cleaning the decoded information $Information_{decode}$ by feature extraction and identification, marking decodable signs $Sign_{decode}$ of decoded information $Information_{decode}$ which is successfully decoded as 1, and decodable signs $Sign_{decode}$ of other decoded information as 0, and inserting the decodable signs $Sign_{decode}$ into the transaction autonomy information data table as features;

(6) determining the fusion possibility of successfully decoded transaction autonomy information $Information_{decode}$ by using an information fusion algorithm $Algorithm_{address\_association}$ based on transaction address association analysis, and fusing fusible transaction autonomy information $Information_{decode}$ to form fused information $Information_{related}$; and (7) extracting an information ID $info_{id}$ before fusion from the fused information $Information_{related}$, and constructing a transaction autonomy information fusion information data table.

The step (1) of, building a Bitcoin client and synchronizing original block stream data to a local area; then parsing and structuring the original block stream data to obtain Bitcoin structured data; and then obtaining an output script of each transaction from the Bitcoin structured data, specifically comprises:

building a Bitcoin client Bitcoin Core, and synchronizing original block stream data Dt to a local area; parsing and structuring the original block stream data Dt to obtain Bitcoin structured data St, wherein the original block stream data Dt represent all block data of the Bitcoin system up to time t, and the Bitcoin structured data St are obtained by processing the block data before time t, including block size $BTC\_Block_{size}$ and transaction list Tx_List; then, searching the transaction list Tx List in the bitcoin structured data St to output a script field in array Outputs; and finally obtaining an output script of each transaction $Tx_{script}^{out}$.

The step (2) of, extracting transaction autonomy information by using a transaction script verification algorithm $Algorithm_{test}$, specifically comprises:

(201) converting the transaction output script $Tx_{script}^{out}$ from a string format to a binary byte stream $Scirpt_{bytearray}$;

(202) initializing an empty stack data structure;

(203) reading a byte from the binary byte stream $Scirpt_{bytearray}$; and deleting the byte from the binary byte stream $Scirpt_{bytearray}$;

(204) converting the byte into a Bitcoin operation code Op_code;

(205) putting the Bitcoin operation code OP_code into a stack;

(206) acquiring a stack top Bitcoin operation code OP_code, and operating the stack according to the stack top Bitcoin operation code Op_code;

(207) if the stack top Bitcoin operation code Op_code has subsequent input parameters, reading a corresponding number of bytes Bytes from the binary byte stream $Scirpt_{bytearray}$;

(208) putting the number of bytes Bytes into the stack;

(209) repeating (203) to (208) until the binary byte stream $Scirpt_{bytearray}$ is empty; and (210) verifying a stack top element; if the top stack element is a Boolean type True, determining that the transaction output script verification succeeds; if the top stack element is a Boolean type False, determining that the transaction output script verification fails; and if the top stack element is not a Boolean type, determining that it is the extracted transaction autonomy information $Tx_{information}$, which will still be preserved on the blockchain, wherein corresponding unspent coins will be transferred to miners.

The step (3) of, extracting blockchain features from the transaction autonomy information $Tx_{information}$, and then constructing a transaction autonomy information data table by using the transaction autonomy information and the blockchain features, specifically comprises:

extracting blockchain features from the transaction autonomy information $Tx_{information}$: ID $Block_{id}$, block hash $Block_{hash}$, transaction version $Block_{version}$, block height $Block_{number}$, block generation time $Block_{timestamp}$, transaction hash $Block_{this\_txhash}$, input script transaction hash $Block_{input\_txhash}$, input value $Block_{input\_value}$, input address $Block_{input\_address}$, miner's fee $Block_{fee}$, output script $Block_{output\_script\_asm}$, ASCII script $Block_{output\_script\_asc}$ and decoded output script $Block_{output\_script\_decode}$; and then constructing a transaction autonomy information data table by using the transaction autonomy information and the blockchain features.

The step (4) of, decoding the transaction autonomy information $Tx_{information}$ by using a transaction autonomy information decoding algorithm $Algorithm_{code\_recognition}$ to obtain decoded information $Information_{decode}$, specifically comprises:

(401) constructing an encoding table $Code_{info}$ by using known transaction autonomy information encoding rules;

(402) reading a piece of transaction autonomy information $Tx_{information}$ in the transaction autonomy information data table;

(403) reading the first two digits of a hexadecimal string of the transaction autonomy information $Tx_{information}$;

and converting the same into a character $Char_{bytes}$ according to a hexadecimal integer;

(404) determining whether the character $Char_{bytes}$ is a natural language character; if so, proceeding to (405); otherwise, proceeding to (406);

(405) executing (410) until the hexadecimal string of the transaction autonomy information $Tx_{information}$ is empty, and finally obtaining decoded information $Information_{decode}$ of the transaction autonomy information $Tx_{information}$;

(406) continuing to read the first two digits of the hexadecimal string of the transaction autonomy information $Tx_{information}$, and searching the coding table $Code_{info}$ for decoding rules for a four-digit hexadecimal integer according to Unicode coding rules; if found, proceeding to (407); otherwise, proceeding to (408);

(407) decoding according to the coding table $Code_{info}$ and marking a coding language of the transaction autonomy information; repeating (403) until the hexadecimal string of the transaction autonomy information $Tx_{information}$ is empty; and finally obtaining the decoded information $Information_{decode}$ of the transaction autonomy information $Tx_{information}$;

(408) marking the transaction autonomy information $Tx_{information}$ as undecodable;

(409) inserting the decoded information $Information_{decode}$ into the transaction autonomy information data table as features, and if the transaction autonomy information is undecodable, inserting the transaction autonomy information $Tx_{information}$; and (410) repeating (402) to (409) until all transaction autonomy information $Tx_{information}$ is decoded.

The step (6) of, using an information fusion algorithm $Algorithm_{address\_association}$ based on transaction address association analysis to determine the fusion possibility of successfully decoded autonomy information data $Information_{decode}$, and fusing fusible autonomy information data $Information_{decode}$ to form fused information $Information_{related}$, specifically comprises:

(601) inputting decoded information $Information_{decode}$ of a piece of transaction autonomy information;

(602) determining whether the decoded information $Information_{decode}$ is fusible information by using a fusible information identification algorithm $Algorithm_{is\_fusible}$; if so, proceeding to (603); otherwise, proceeding to (606);

(603) if the information is backward fusion information, proceeding to (604); if the information is forward fusion information, proceeding to (605); if the information is not fusible information, proceeding to (606);

(604) reading an input script transaction hash $Block_{input\_txhash}$ of the decoded information in the transaction autonomy information data table generated in step (3), determining whether there is fusible information in the output of the transaction, and if so, conducting information fusion to generate fused information $Information_{related}$; then proceeding to (606);

(605) reading a transaction hash $Block_{this\_txhash}$ of the decoded information in the transaction autonomy information data table generated in step (3), determining if there is fusible information using the transaction hash as an input script transaction hash $Block_{input\_txhash}$, and if so, performing information fusion to generate fused information $Information_{related}$; and (606) repeating (601) to (605) until the decoded information of all transaction autonomy information is fused.

The step (602) of, determining whether the decoded information Information$_{decode}$ is fusible information by using a fusible information identification algorithm Algorithm$_{is\_fusible}$, specifically comprises:

(60201) initializing a table of characters to be matched, which contains flag bits of each character to be matched, wherein the flag bits of all characters have a value of 0;

(60202) inputting decoded information Information$_{decode}$ of a piece of transaction autonomy information;

(60203) reading a character from the decoded information Information$_{decode}$, and determining whether the character is a character to be matched; if so, proceeding to (60204); otherwise, proceeding to (60205);

(60204) determining whether the character is a start character or an end character; if it is a start character, incrementing the flag bit value of the character to be matched in the table of characters to be matched by 1; if it is an end character, decrementing the flag bit value of the character to be matched by 1; if it is neither a start character nor an end character, performing no operation;

(60205) repeating (60202) to (60204) until the decoded information Information$_{decode}$ is empty; and (60206) determining that the decoded information is not fusible information if the flag bit values of all the characters to be matched are 0; determining that the decoded information is not fusible information if the flag bit values of some of the characters to be matched are positive and those of some characters to be matched are negative; determining that the decoded information is backward fusible information if the flag bit values of some of the characters to be matched are positive and those of other characters are 0, and returning to the table of characters to be matched; and determining that the decoded information is forward fusible information if the flag bit values of some of the characters to be matched are negative and those of other characters are 0, and returning to the table of characters to be matched.

The beneficial effects of the method for extracting and parsing Bitcoin transaction autonomy information provided by the present invention are as follows.

1. Universality: This method is applicable to mainstream blockchain systems such as Ethereum, EOS, Polkadot, and Fabric through analysis of the current architecture of blockchain technology.

2. Effectiveness: Taking the relationship between emotional tendency of transaction autonomy information and price changes as an example, a generated dataset shows good performance in monitoring online public opinions.

3. Progressiveness: This method for extracting and parsing Bitcoin transaction autonomy information is helpful for implementing public opinion monitoring in blockchain systems, enhancing cybersecurity, and improving the level of information analysis.

DETAILED DESCRIPTION OF THE INVENTION

Figure 1:
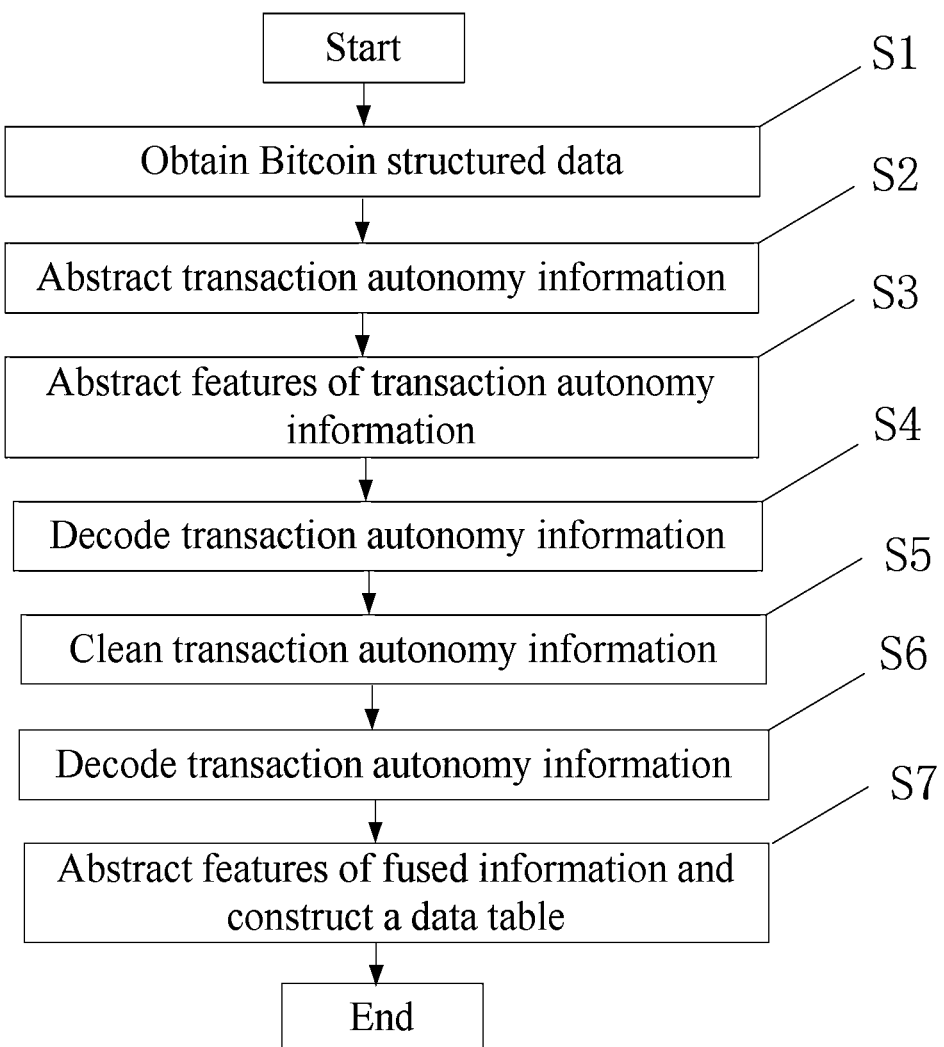
FIG. 1 is a flowchart of a method for extracting and parsing Bitcoin transaction autonomy information provided by the present invention.
Figure 2:
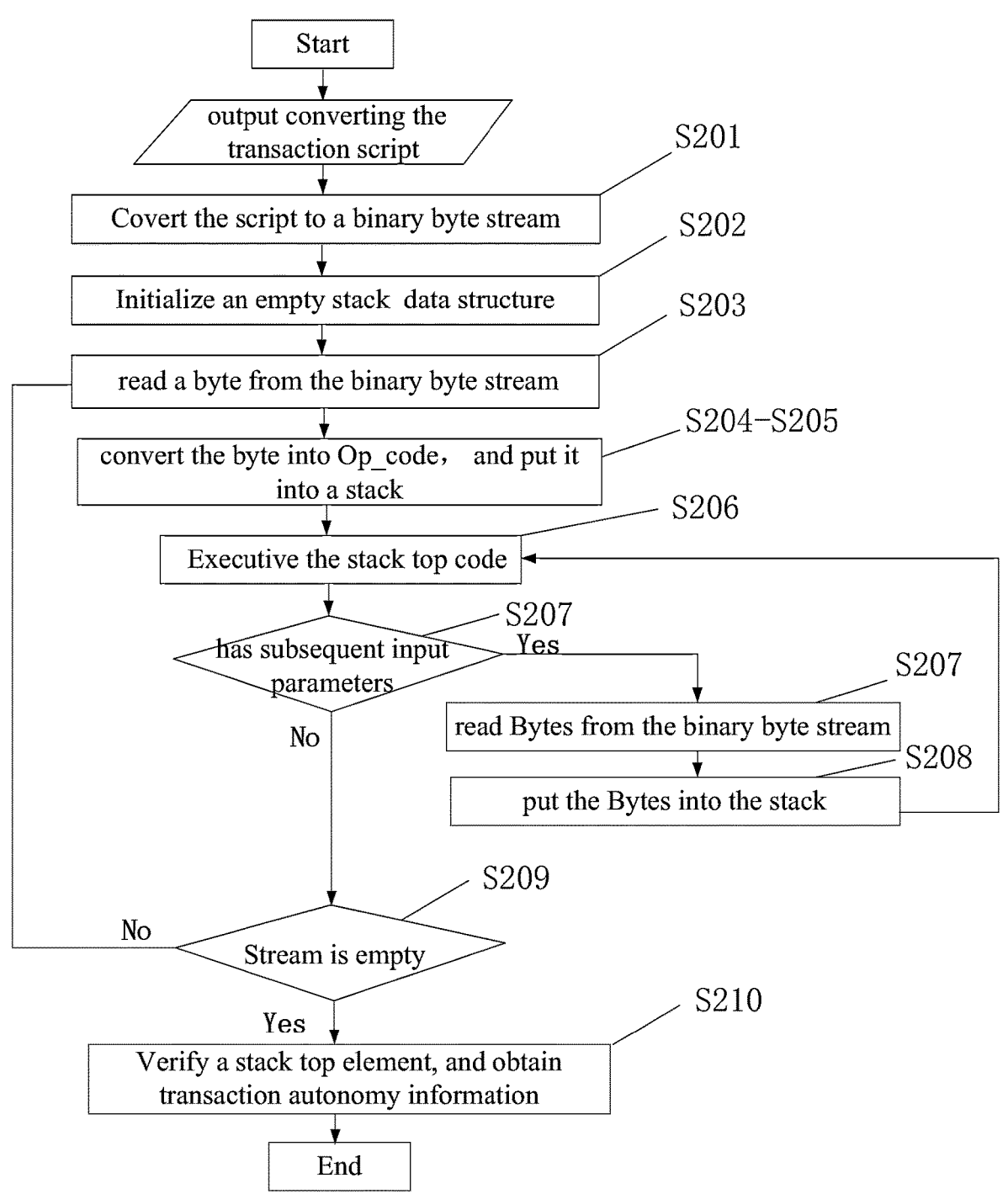
FIG. 2 is a process flow diagram of a transaction script verification algorithm in the present invention.
Figure 3:
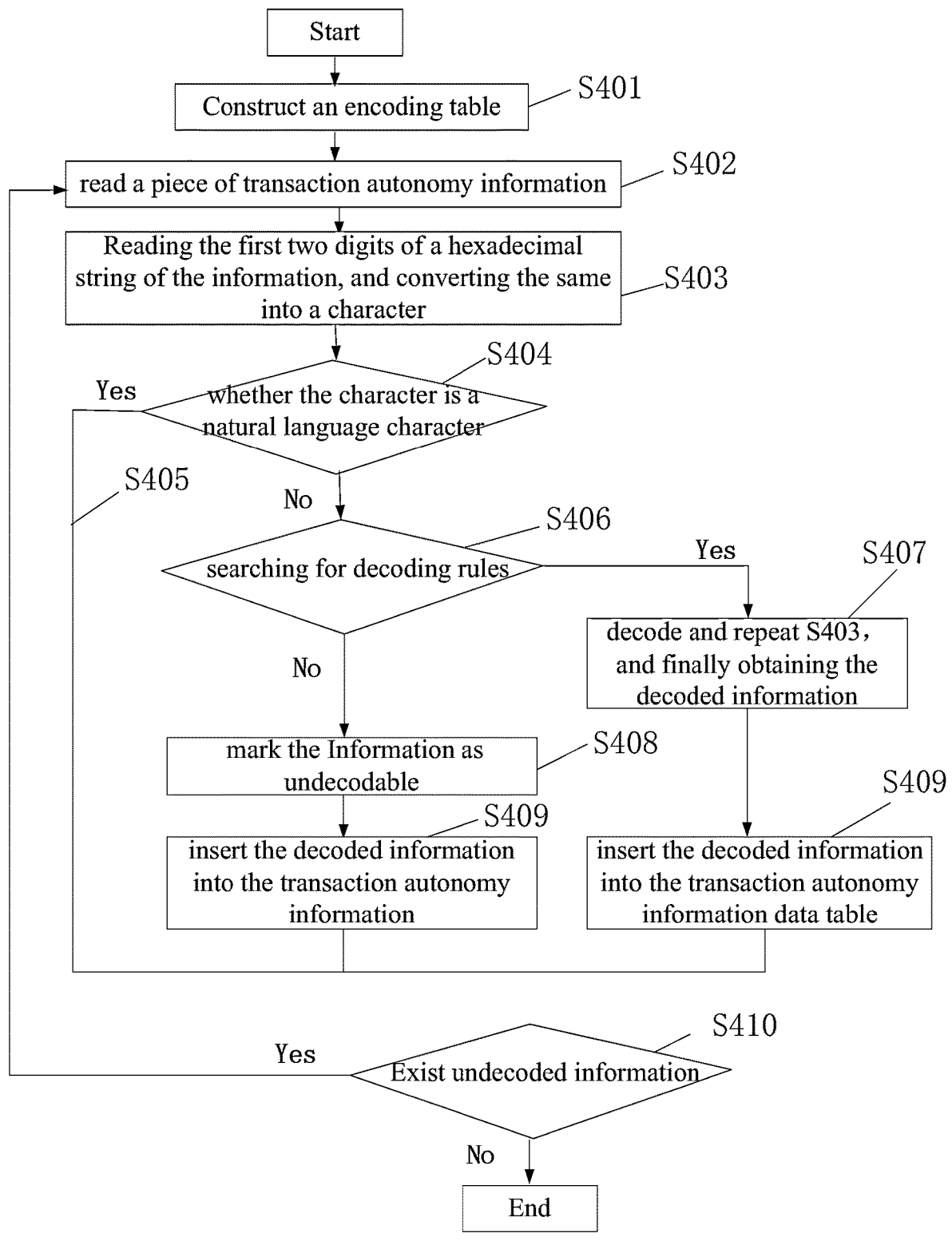
FIG. 3 is a process flow diagram of a transaction autonomy information code identification algorithm in the present invention.
Figure 4:
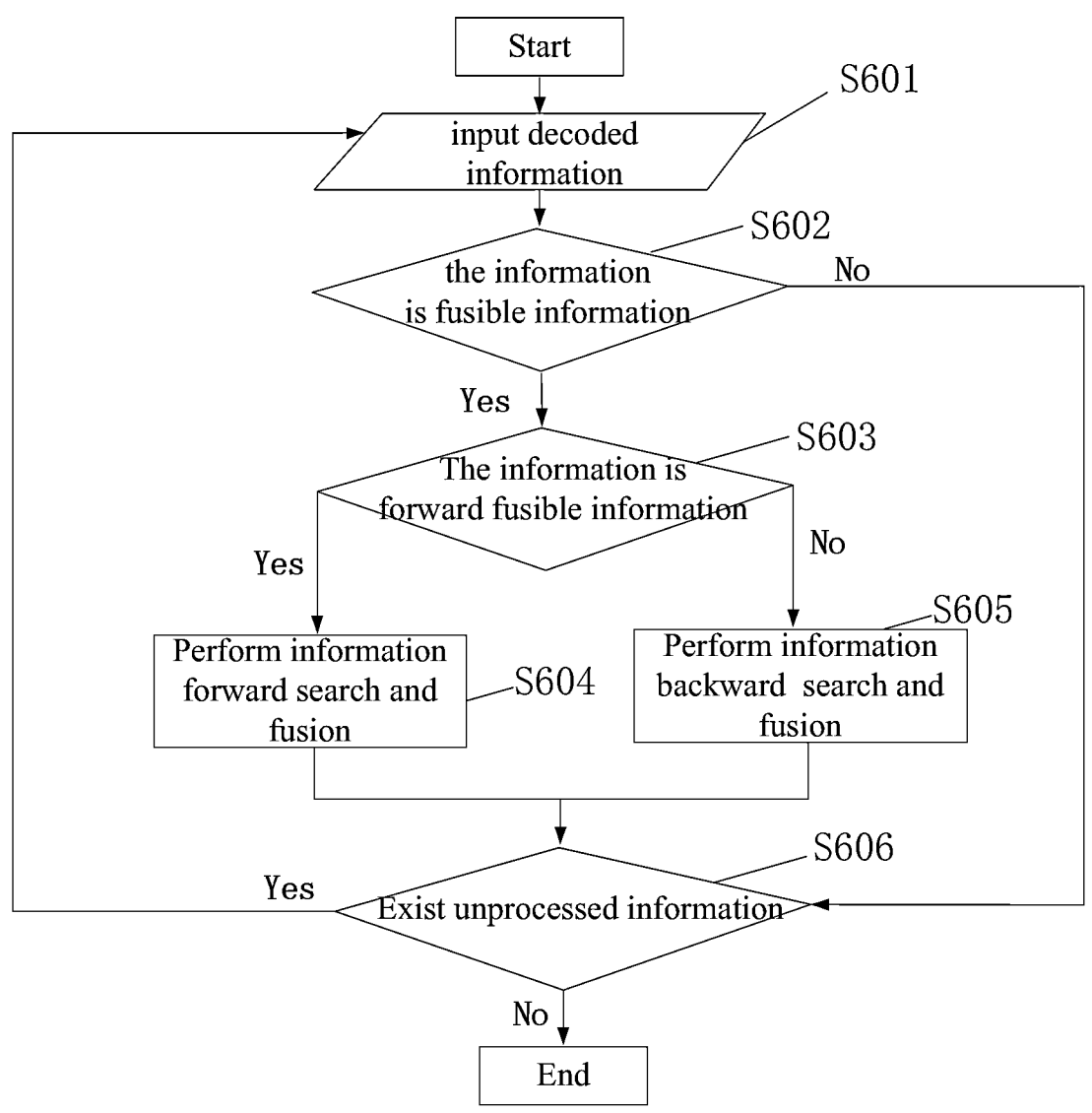
FIG. 4 is a process flow diagram of an information fusion algorithm based on transaction address association analysis in the present invention.
Figure 5:
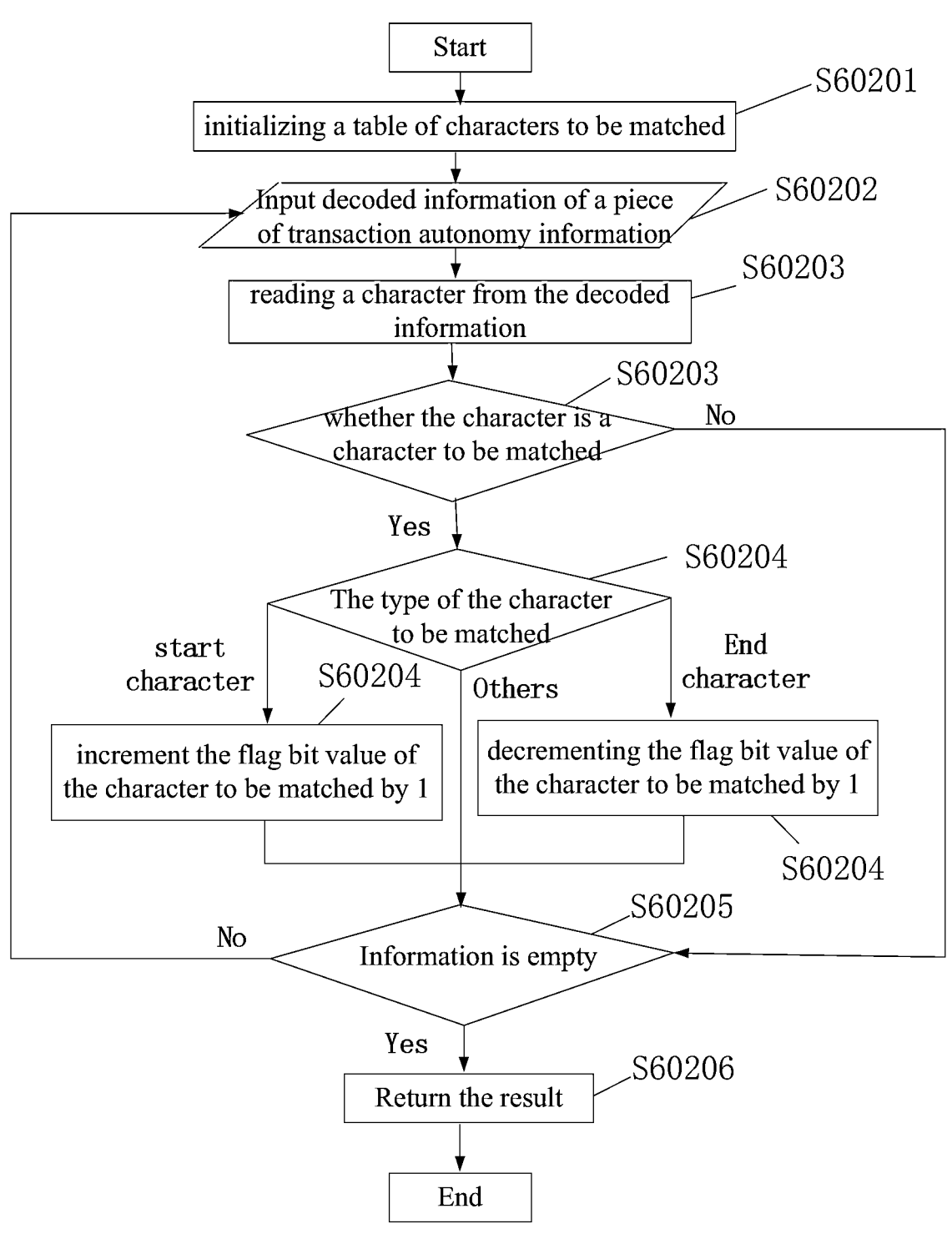
FIG. 5 is a process flow diagram of a fusible information identification algorithm in the present invention.

Specific embodiments will be provided below for further explanation of the present invention.

A method for extracting and parsing Bitcoin transaction autonomy information provided by the invention comprises the following steps in sequence:

(1) building a Bitcoin client and synchronizing original block stream data to a local area; then parsing and structuring the original block stream data to obtain Bitcoin structured data; and then obtaining an output script of each transaction from the Bitcoin structured data; specifically comprising:

building a Bitcoin client Bitcoin Core, and synchronizing original block stream data Dt to a local area; parsing and structuring the original block stream data Dt to obtain Bitcoin structured data St, wherein the original block stream data Dt represent all block data of the Bitcoin system up to time t, and the Bitcoin structured data St are obtained by processing the block data before time t, including block size BTC_Block$_{size}$ and transaction list Tx_List; then, searching for the transaction list Tx List in the bitcoin structured data St to output a script field in array Outputs; and finally obtaining an output script of each transaction $$Tx^{out}_{script};$$

(2) verifying the validity of the transaction output script by using a transaction script verification algorithm Algorithm$_{test}$; determining that the transaction is true and valid and does not contain any transaction autonomy information if the verification succeeds; and returning transaction autonomy information Tx$_{information}$ if the verification fails;

specifically comprising:

(201) converting the transaction output script $$Tx^{out}_{script}$$

from a string format to a binary byte stream Scirpt$_{bytearray}$;

(202) initializing an empty stack data structure;

(203) reading a byte from the binary byte stream Scirpt$_{bytearray}$ and deleting the byte from the binary byte stream Scirpt$_{bytearray}$;

(204) converting the byte into a Bitcoin operation code Op_code;

(205) putting the Bitcoin operation code OP_code into a stack;

(206) acquiring a stack top Bitcoin operation code OP_code, and operating the stack according to the stack top Bitcoin operation code Op_code;

(207) if the stack top Bitcoin operation code Op_code has subsequent input parameters, reading a corresponding number of bytes Bytes from the binary byte stream $Scirpt_{bytearray}$;

(208) putting the number of bytes Bytes into the stack;

(209) repeating (203) to (208) until the binary byte stream $Scirpt_{bytearray}$ is empty; and (210) verifying a stack top element; if the top stack element is a Boolean type True, determining that the transaction output script verification succeeds; if the top stack element is a Boolean type False, determining that the transaction output script verification fails; and if the top stack element is not a Boolean type, determining that it is the extracted transaction autonomy information $Tx_{information}$, which will still be preserved on the blockchain, wherein corresponding unspent coins will be transferred to miners;

(3) extracting blockchain features from the transaction autonomy information $Tx_{information}$, and then constructing a transaction autonomy information data table by using the transaction autonomy information and the blockchain features;

specifically comprising:

extracting blockchain features from the transaction autonomy information $Tx_{information}$: ID $Block_{id}$, block hash $Block_{hash}$, transaction version $Block_{version}$, block height $Block_{number}$, block generation time $Block_{timestamp}$, transaction hash $Block_{this\_txhash}$, input script transaction hash $Block_{input\_txhash}$, input value $Block_{input\_value}$, input address $Block_{input\_address}$, miner's fee $Block_{fee}$, output script $Block_{output\_script\_asm}$, ASCII script $Block_{output\_script\_asc}$ and decoded output script $Block_{output\_script\_decode}$; and then constructing a transaction autonomy information data table by using the transaction autonomy information and the blockchain features;

(4) sequentially reading the transaction autonomy information $Tx_{information}$ from the transaction autonomy information data table, and decoding the transaction autonomy information $Tx_{information}$ by using a transaction autonomy information decoding algorithm $Algorithm_{code\_recognition}$ to obtain decoded information $Information_{decode}$; and then inserting the decoded information $Information_{decode}$ into the transaction autonomy information data table as features;

specifically comprising:

(401) constructing an encoding table $Code_{info}$ by using known transaction autonomy information encoding rules;

(402) reading a piece of transaction autonomy information $Tx_{information}$ in the transaction autonomy information data table;

(403) reading the first two digits of a hexadecimal string of the transaction autonomy information $Tx_{information}$, and converting the same into a character $Char_{bytes}$ according to a hexadecimal integer;

(404) determining whether the character $Char_{bytes}$ is a natural language character; if so, proceeding to (405); otherwise, proceeding to (406);

(405) executing (410) until the hexadecimal string of the transaction autonomy information $Tx_{information}$ is empty, and finally obtaining decoded information $Information_{decode}$ of the transaction autonomy information $Tx_{information}$;

(406) continuing to read the first two digits of the hexadecimal string of the transaction autonomy information $Tx_{information}$, and searching the coding table $Code_{info}$ for decoding rules for a four-digit hexadecimal integer according to Unicode coding rules; if found, proceeding to (407); otherwise, proceeding to (408);

(407) decoding according to the coding table $Code_{info}$ and marking a coding language of the transaction autonomy information; repeating (403) until the hexadecimal string of the transaction autonomy information $Tx_{information}$ is empty; and finally obtaining the decoded information $Information_{decode}$ of the transaction autonomy information $Tx_{information}$;

(408) marking the transaction autonomy information $Tx_{information}$ as undecodable;

(409) inserting the decoded information $Information_{decode}$ into the transaction autonomy information data table as features, and if the transaction autonomy information is undecodable, inserting the transaction autonomy information $Tx_{information}$; and (410) repeating (402) to (409) until all transaction autonomy information $Tx_{information}$ is decoded;

(5) cleaning the decoded information $Information_{decode}$ by feature extraction and identification, marking decodable signs $Sign_{decode}$ of decoded information $Information_{decode}$ which is successfully decoded as 1, and decodable signs $Sign_{decode}$ of other decoded information as 0, and inserting the decodable signs $Sign_{decode}$ into the transaction autonomy information data table as features;

(6) determining the fusion possibility of successfully decoded transaction autonomy information $Information_{decode}$ by using an information fusion algorithm $Algorithm_{address\_association}$ based on transaction address association analysis, and fusing fusible transaction autonomy information $Information_{decode}$ to form fused information $Information_{decode}$;

specifically comprising:

(601) inputting decoded information $Information_{decode}$ of a piece of transaction autonomy information;

(602) determining whether the decoded information $Information_{decode}$ is fusible information by using a fusible information identification algorithm $Algorithm_{is\_fusible}$; if so, proceeding to (603); otherwise, proceeding to (606);

(603) if the information is backward fusion information, proceeding to (604); if the information is forward fusion information, proceeding to (605); if the information is not fusible information, proceeding to (606);

(604) reading an input script transaction hash $Block_{input\_txhash}$ of the decoded information in the transaction autonomy information data table generated in step (3), determining whether there is fusible information in the output of the transaction, and if so, conducting information fusion to generate fused information $Information_{related}$; then proceeding to (606);

(605) reading a transaction hash $Block_{this\_txhash}$ of the decoded information in the transaction autonomy information data table generated in step (3), determining if there is fusible information using the transaction hash as an input script transaction hash $Block_{input\_address}$, and if so, performing information fusion to generate fused information $Information_{related}$; and (606) repeating (601) to (605) until the decoded information of all transaction autonomy information is fused;

wherein the step (602) of, determining whether the decoded information $Information_{decode}$ is fusible information by using a fusible information identification algorithm $Algorithm_{is\_fusible}$, specifically comprises:

(60201) initializing a table of characters to be matched, which contains flag bits of each character to be matched, wherein the flag bits of all characters have a value of 0;

(60202) inputting decoded information $Information_{decode}$ of a piece of transaction autonomy information;

(60203) reading a character from the decoded information $Information_{decode}$, and determining whether the character is a character to be matched; if so, proceeding to (60204); otherwise, proceeding to (60205);

(60204) determining whether the character is a start character or an end character; if it is a start character, incrementing the flag bit value of the character to be matched in the table of characters to be matched by 1; if it is an end character, decrementing the flag bit value of the character to be matched by 1; if it is neither a start character nor an end character, performing no operation;

(60205) repeating (60202) to (60204) until the decoded information $Information_{decode}$ is empty; and (60206) determining that the decoded information is not fusible information if the flag bit values of all the characters to be matched are 0; determining that the decoded information is not fusible information if the flag bit values of some of the characters to be matched are positive and those of some characters to be matched are negative; determining that the decoded information is backward fusible information if the flag bit values of some of the characters to be matched are positive and those of other characters are 0, and returning to the table of characters to be matched; and determining that the decoded information is forward fusible information if the flag bit values of some of the characters to be matched are negative and those of other characters are 0, and returning to the table of characters to be matched; and (7) extracting an information ID $info_{id}$ before fusion from the fused information $Information_{related}$, and constructing a transaction autonomy information fusion information data table.

What is claimed is:

1. A method for extracting and parsing Bitcoin transaction autonomy information, includes the following steps in sequence:

(1) building a Bitcoin client and synchronizing original block stream data to a local area, then parsing and structuring the original block stream data to obtain Bitcoin structured data, and then obtaining an output script of each transaction from the Bitcoin structured data;

(2) verifying a validity of the transaction output script by using a transaction script verification algorithm $Algorithm_{test}$, and returning transaction autonomy information $Tx_{information}$ in response to determining failure to verify the validity of the transaction output script; and executing remaining steps, wherein the transaction autonomy information $Tx_{information}$ corresponds to online public opinion information; and wherein obtaining the transaction autonomy information $Tx_{information}$ using the transaction script verification algorithm $Algorithm_{test}$ comprises:

(201) converting the transaction output script $Tx_{script}^{out}$ from a string format to a binary byte stream $Scirpt_{bytearray}$;

(202) initializing an empty stack data structure;

(203) reading a byte from the binary byte stream $Scirpt_{bytearray}$; and deleting the byte from the binary byte stream $Scirpt_{bytearray}$;

(204) converting the byte into a Bitcoin operation code Op code;

(205) putting the Bitcoin operation code OP code into a stack;

(206) acquiring a stack top Bitcoin operation code OP code, and operating the stack according to the stack top Bitcoin operation code Op code;

(207) in response to the stack top Bitcoin operation code Op code has subsequent input parameters, reading a corresponding number of bytes Bytes from the binary byte stream $Scirpt_{bytearray}$;

(208) putting the number of bytes Bytes into the stack;

(209) repeating (203) to (208) until the binary byte stream $Scirpt_{bytearray}$ is empty; and (210) verifying a stack top element; in response to the top stack element is a Boolean type True, determining that the transaction output script verification succeeds; in response to the top stack element is a Boolean type False, determining that the transaction output script verification fails; and in response to the top stack element is not a Boolean type, determining that it is the extracted transaction autonomy information $Tx_{information}$, which will still be preserved on the blockchain, wherein corresponding unspent coins will be transferred to miners;

(3) extracting blockchain features from the transaction autonomy information $Tx_{information}$, and then constructing a transaction autonomy information data table by using the transaction autonomy information and the blockchain features;

(4) sequentially reading the transaction autonomy information Tx in formation from the transaction autonomy information data table, and decoding the transaction autonomy information $Tx_{information}$ by using a transaction autonomy information decoding algorithm $Algorithm_{code\_recognition}$ to obtain decoded information $Information_{decode}$, and then inserting the decoded information $Information_{decode}$ into the transaction autonomy information data table as features;

(5) cleaning the decoded information $Information_{decode}$ by feature extraction and identification, marking decodable signs $Sign_{decode}$ of the decoded information $Information_{decode}$ which is successfully decoded as 1, and decodable signs $Sign_{decode}$ of other decoded information as 0, and inserting the decodable signs $Sign_{decode}$ into the transaction autonomy information data table as features;

(6) determining a fusion possibility of successfully decoded transaction autonomy information $Information_{decode}$ by using an information fusion algorithm $Algorithm_{address\_association}$ based on transaction address association analysis, and fusing fusible transaction autonomy information $Information_{decode}$ to form fused information $Information_{related}$; and (7) extracting an information ID $info_{id}$ before fusion from the fused information Information related, and constructing a transaction autonomy information fusion information data table, wherein monitoring the online public opinion information on a blockchain is achieved.

2. The method for extracting and parsing Bitcoin transaction autonomy information of claim 1, wherein the step (1) of, building the Bitcoin client and synchronizing the original block stream data to the local area; then parsing and structuring the original block stream data to obtain the Bitcoin structured data; and then obtaining the output script of each transaction from the Bitcoin structured data, specifically comprises:

building a Bitcoin client Bitcoin Core, and synchronizing original block stream data Dt to the local area; parsing and structuring the original block stream data Dt to obtain Bitcoin structured data St, wherein the original block stream data Dt represent all block data of the Bitcoin system up to time t, and the Bitcoin structured data St are obtained by processing the block data before time t, including block size $BTC\_Block_{size}$ and transaction list Tx_List; then, searching the transaction list Tx_List in the bitcoin structured data St to output a script field in array Outputs; and finally obtaining an output script of each transaction $Tx_{script}^{out}$.

3. The method for extracting and parsing Bitcoin transaction autonomy information of claim 1, wherein the step (3) of, extracting blockchain features from the transaction autonomy information $Tx_{information}$, and then constructing a transaction autonomy information data table by using the transaction autonomy information and the blockchain features, specifically comprises:

extracting blockchain features from the transaction autonomy information $Tx_{information}$: ID $Block_{id}$, block hash $Block_{hash}$, transaction version $Block_{version}$, block height $Block_{number}$, block generation time $Block_{timestamp}$, transaction hash $Block_{this\_txhash}$, input script transaction hash $Block_{input\_txhash}$, input value $Block_{input\_value}$, input address $Block_{input\_address}$, miner's fee $Block_{fee}$, output script $Block_{output\_script\_asm}$, ASCII script $Block_{output\_script\_asc}$ and decoded output script $Block_{output\_script\_decode}$, and then constructing the transaction autonomy information data table by using the transaction autonomy information and the blockchain features.

* * * * *